(12) United States Patent
Hällfors

(10) Patent No.: US 12,473,730 B2
(45) Date of Patent: Nov. 18, 2025

(54) WALL ASSEMBLY AND A SOUNDPROOF BOOTH

(71) Applicant: FRAMERY OY, Tampere (FI)

(72) Inventor: Miika Hällfors, Tampere (FI)

(73) Assignee: FRAMER OY, Tampere (FI)

( * ) Notice: Subject to any disclaimer, the term of this patent is extended or adjusted under 35 U.S.C. 154(b) by 209 days.

(21) Appl. No.: 18/036,443

(22) PCT Filed: Oct. 15, 2021

(86) PCT No.: PCT/FI2021/050689
§ 371 (c)(1),
(2) Date: May 11, 2023

(87) PCT Pub. No.: WO2022/123105
PCT Pub. Date: Jun. 16, 2022

(65) Prior Publication Data
US 2024/0018775 A1 Jan. 18, 2024

(30) Foreign Application Priority Data
Dec. 9, 2020 (FI) .................................. 20206273

(51) Int. Cl.
*E04C 2/292* (2006.01)
*E04B 1/82* (2006.01)
(Continued)

(52) U.S. Cl.
CPC .......... *E04B 1/8218* (2013.01); *E04B 2/7403* (2013.01); *E04C 2/292* (2013.01);
(Continued)

(58) Field of Classification Search
CPC . E04B 1/82; E04B 1/8218; E04B 1/84; E04B 2001/8447; E04B 2001/8452;
(Continued)

(56) References Cited

U.S. PATENT DOCUMENTS

| 2,927,665 A | 3/1960 | Hauf |
| 3,608,260 A | 9/1971 | Eckel et al. |

(Continued)

FOREIGN PATENT DOCUMENTS

| CN | 210195370 U | * 3/2020 |
| FR | 2733262 A1 | 10/1996 |

(Continued)

OTHER PUBLICATIONS

European Patent Office, International Search Report and Written Opinion, PCT/FI2021/050689, Mailed Jan. 25, 2022, 12 pages.

(Continued)

*Primary Examiner* — Edgardo San Martin
(74) *Attorney, Agent, or Firm* — ZIEGLER IP LAW GROUP, LLC.

(57) ABSTRACT

A wall assembly for a soundproof space includes a wall module having a first wall and a second wall joined together at end portions of the module to form an enclosure therebetween, and sound absorbing material within the enclosure. The enclosure is formed of the first wall and the second wall, and the first wall and/or the second wall provides an incombustible surface. A soundproof booth includes the wall assembly.

18 Claims, 7 Drawing Sheets

(51) Int. Cl.
  *E04B 1/84* (2006.01)
  *E04B 2/74* (2006.01)
  *E04C 2/34* (2006.01)
  *E04C 2/52* (2006.01)
  *E04H 1/12* (2006.01)
  *E04H 1/14* (2006.01)

(52) U.S. Cl.
  CPC ............... *E04C 2/34* (2013.01); *E04C 2/52* (2013.01); *E04H 1/125* (2013.01); *E04H 1/14* (2013.01); *E04B 2001/8447* (2013.01); *E04B 2002/7488* (2013.01)

(58) Field of Classification Search
  CPC ..... E04B 2001/8442; E04B 2001/8423; E04B 2/74; E04B 2/7403; E04B 2002/7488; E04C 2/292; E04C 2/34; E04C 2/52; E04H 1/12; E04H 1/14; E04H 1/125
  See application file for complete search history.

(56) References Cited

U.S. PATENT DOCUMENTS

| | | | | |
|---|---|---|---|---|
| 3,783,563 A * | 1/1974 | Moore | ................ | B32B 3/30 |
| | | | | 52/762 |
| 3,885,362 A * | 5/1975 | Pollock | ................ | E04B 2/7409 |
| | | | | 52/270 |
| 3,963,094 A * | 6/1976 | Nowikas | ................ | E04B 1/8218 |
| | | | | 181/198 |
| 4,702,046 A * | 10/1987 | Haugen | ................ | E04B 1/86 |
| | | | | 52/144 |
| 4,843,788 A * | 7/1989 | Gavin | ................ | E04H 3/08 |
| | | | | 52/750 |
| 5,123,874 A | 6/1992 | White, III | | |
| 5,210,984 A * | 5/1993 | Eckel | ................ | E04B 1/8218 |
| | | | | 52/270 |
| 5,512,715 A * | 4/1996 | Takewa | ................ | G10K 11/168 |
| | | | | 181/290 |
| 5,927,032 A | 7/1999 | Record | | |
| 7,178,297 B2 * | 2/2007 | Seavy | ................ | E04B 1/08 |
| | | | | 52/79.5 |
| 8,556,028 B1 * | 10/2013 | Nason | ................ | E06B 5/20 |
| | | | | 181/290 |
| 9,249,572 B2 * | 2/2016 | Neumayr | ................ | E04C 2/3405 |
| 12,168,869 B2 * | 12/2024 | Mattsson | ................ | E04H 1/125 |
| 2012/0085062 A1 | 4/2012 | Neumayr | | |
| 2013/0264146 A1 * | 10/2013 | Nason | ................ | E06B 5/20 |
| | | | | 181/290 |
| 2019/0119902 A1 * | 4/2019 | Chen | ................ | E04B 1/8218 |
| 2021/0148128 A1 * | 5/2021 | Ko | ................ | E06B 5/10 |
| 2022/0298783 A1 * | 9/2022 | Shi | ................ | E04B 1/3445 |
| 2023/0399842 A1 * | 12/2023 | Luhtasela | ................ | E04B 1/8218 |

FOREIGN PATENT DOCUMENTS

| | | |
|---|---|---|
| GB | 1467811 A | 3/1977 |
| JP | 2010053637 A * | 3/2010 |
| KR | 100799284 B1 * | 1/2008 |
| WO | 2017134341 A1 | 8/2017 |

OTHER PUBLICATIONS

Finnish Patent and Registration Office, office action, application No. 20206273, Sep. 30, 2022, 5 pages.
Finnish Patent and Registration Office, search report, Application No. 20206273, Jun. 24, 2021, 2 pages.
Liz, "A closer look at sound damping vs. absorption", Technicon Acoustics, Sound Science, Sep. 30, 2019, 5, https://www.techniconacoustics.com/blog/sound-damping-vs-absorption/, 5 pages.

* cited by examiner

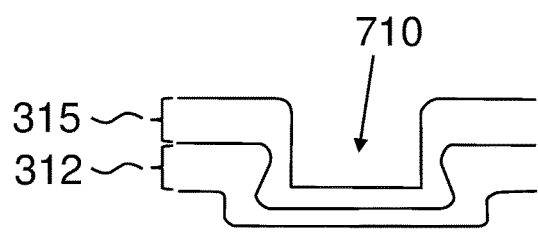
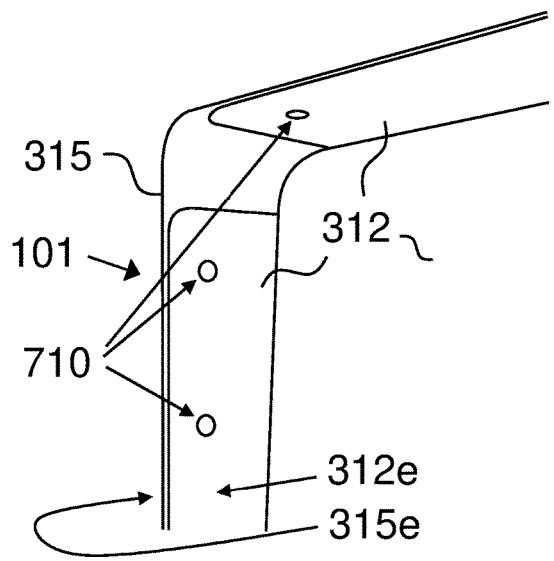
Fig. 7
Fig. 8
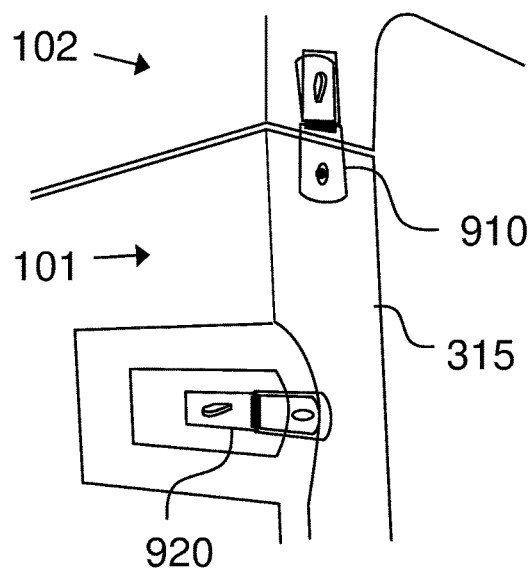
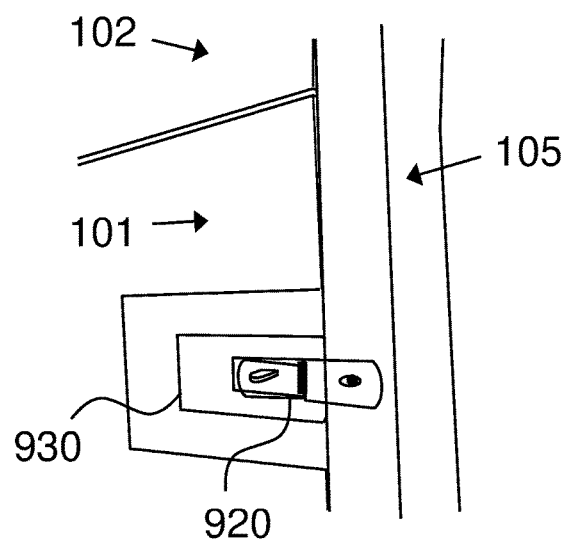
Fig. 9
Fig. 10

WALL ASSEMBLY AND A SOUNDPROOF BOOTH

FIELD

The present disclosure generally relates to wall assemblies suitable for soundproofing.

BACKGROUND

This section illustrates useful background information without admission of any technique described herein representative of the state of the art.

Soundproof spaces, such as soundproof conference or phone booths, are increasingly used in modern furnishing of workplaces as well as public spaces. Such spaces are often used for working, telephone calls and video conferencing.

Wall structures of such spaces should on the one hand be slim, aesthetic, and easy to assemble and on the other hand provide effective soundproofing, especially against speech, while maintaining a comfortable working environment inside the space. Minimizing the fire load of the structure is also desirable.

SUMMARY

The aspects of the disclosed embodiments are directed to provide an improved wall structure or assembly or at least to provide an alternative to existing solutions.

According to a first example aspect of the disclosed embodiments there is provided a wall assembly for a soundproof space, comprising:
a wall module having a first wall and a second wall joined together at end portions of the module to form an enclosure therebetween; and
sound absorbing material within the enclosure, wherein the enclosure is formed of said first wall and said second wall, and wherein the first wall or the second wall provides an incombustible surface, and wherein the wall assembly comprises:
a cover covering the second wall, wherein the wall assembly comprises a volume for wirings in between the second wall and the cover.

According to more general formulation of the first example aspect of the disclosed embodiments there is provided a wall assembly for a soundproof space, comprising:
a wall module having a first wall and a second wall joined together at end portions of the module to form an enclosure therebetween; and
sound absorbing material within the enclosure, wherein the enclosure is formed of said first wall and said second wall, and wherein the first wall or the second wall provides an incombustible surface.

In this context the term soundproof space is intended to mean silent working places or similar. The wall assembly should attenuate sound, preferably at least in human speech frequencies, at least to an adequate degree. It is not necessary to stop sound completely.

The term sound absorbing material is intended to mean materials purposely used for sound absorption by dissipating airborne sound waves by the said material (in contrast to damping sound).

In certain embodiments, the sound absorbing material is or comprises porous material.

In certain embodiments, the enclosure extends between end portions of the wall module. In certain embodiments, the first and second walls are front (or innermost) and rear (or outermost) walls of the wall module. In certain embodiments, the wall module is of a general shape of a rectangle. In certain embodiments, the first and second walls are joined at each side of the rectangle.

In certain embodiments, the wall module provides an incombustible surface.

Accordingly, in certain embodiments, at least one of the first wall and the second wall provides an incombustible surface. In certain embodiments, both the first wall and the second wall provide an incombustible surface. In certain embodiments, a purpose of the incombustible surface(s) is to prevent spreading of a potential fire into a volume behind the said incombustible surface(s). In certain embodiments, the first wall is of metal. In certain embodiments, the second wall is of metal.

In certain embodiments, the wall assembly comprises:
a first wall element of sheet material forming the first wall and a second wall element of sheet material forming the second wall.

In certain embodiments, the enclosure is formed of said sheet material (or sheet materials in case the materials forming the first and second wall are different).

In certain alternative embodiments, instead of having the wall module formed of wall elements, the wall module is a unitary element providing said first and second walls and the enclosure therebetween.

In certain embodiments, the enclosure is merely limited by said sheet material(s). Accordingly, the structure is implemented without discrete additional end portions made of, for example, wood. In certain embodiments, the enclosure is a unitary enclosure substantially having the width and height of the wall module. In certain embodiments, the enclosure substantially covers the whole area of a side wall of a soundproof space or booth.

In certain embodiments, the first and second walls are of fireproof material, and preferably of incombustible material. In certain embodiments, the first and second walls are of material generally considered as sound stopping material.

In certain embodiments, the wall module is a self-contained module. In certain embodiments, the wall module provides a wall module-wide incombustible surface (both sideways and in vertical dimensions). In certain embodiments, the formed enclosure is a fireproof structure.

In certain embodiments, the end portions of the module comprise attachment regions at which the first wall and the second wall are joined together.

In certain embodiments, the wall assembly comprises end portions of the first and second wall superimposed on each other for attachment.

In certain embodiments, one of the first and second walls comprises a curved or bent portion directing that wall towards the other for attachment.

In certain embodiments, the said other wall also comprises a curved or bent portion to cause the end portions of the first and second walls to lie one on top of the other for attachment.

In certain embodiments, the wall assembly comprises the first and second wall joined together at their end portions with at least one clinching joint.

In certain embodiments, the wall assembly comprises: a wall element of sound absorbing material on the side of the first wall facing away from the enclosure.

In certain embodiments, the wall module provides a module-wide recess and raised edges thereto formed by the first wall to place the wall element of sound absorbing material at least partly inside of the recess.

In certain embodiments, the wall element of sound absorbing material is of porous material or comprises porous material. In certain embodiments, the said wall element is intended to absorb both echo and sound.

In certain embodiments, the wall assembly comprises the wall module configured for attaching a door frame or window frame to the wall module at an end portion of the wall module.

In certain embodiments, the wall assembly comprises:
an air layer within the enclosure in between the sound absorbing material and either of the first and the second walls.

In certain embodiments, the air layer extends over the whole surface of the sound absorbing material that faces the first or second wall. Accordingly, the whole surface of the sound absorbing material that faces the wall in question is out of touch with that wall.

In certain embodiments, the wall assembly comprises:
a cover of sheet material covering the second wall.

In certain embodiments, the wall assembly comprises:
a volume for wirings in between the second wall and the cover.

In certain embodiments, the wall assembly comprises:
a volume for electrical components in between the second wall and the cover.

In certain embodiments, the said volume for wirings or electrical components is implemented in the form of at least one recess.

In certain embodiments, the first wall and the second wall are sheet metal elements.

In certain embodiments, the wall module comprises an attaching element, such as a latch, for attaching another structural element, such as a roof module or a floor module, to the wall module.

In certain embodiments, the wall assembly comprises the attaching element at a region of the wall module in which the first wall and the second wall have been joined together.

According to a second example aspect of the disclosed embodiments there is provided a soundproof booth, comprising the wall assembly of the first aspect or any of its embodiments.

In certain embodiments, the soundproof booth is a phone booth. In certain embodiments, the soundproof booth is a soundproof meeting pod or a silent workplace.

In certain embodiments, the soundproof booth comprises structural modules, including the said wall module, attached to each other to form a structure encircling the soundproof space.

In certain embodiments, the soundproof booth comprises a door frame attached to said encircling structure for attaching a door.

In certain embodiments, the wall module comprised by the wall assembly extends from a side frame to another side frame (or extends in between the said frames). In certain embodiments, the wall module further extends from a floor module to a roof module.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments apply to other example aspects as well. In particular, the embodiments described in the context of the first aspect are applicable to each further aspect. Any appropriate combinations of the embodiments may be formed.

BRIEF DESRCIPTON OF THE FIGURES

Some example embodiments will be described with reference to the accompanying figures, in which:

FIG. 7 shows a clinching joint joining a first wall and a second wall together in accordance with certain embodiments;

FIG. 8 shows certain details of a wall module of the soundproof booth in accordance with certain embodiments;

FIG. 9 shows a schematic view of the soundproof booth at the connection area in which a wall module connects with a roof module in accordance with certain embodiments; and FIG. 10 shows the soundproof booth with a door frame attached in accordance with certain embodiments.

DETAILED DESCRIPTION

Figure 1:
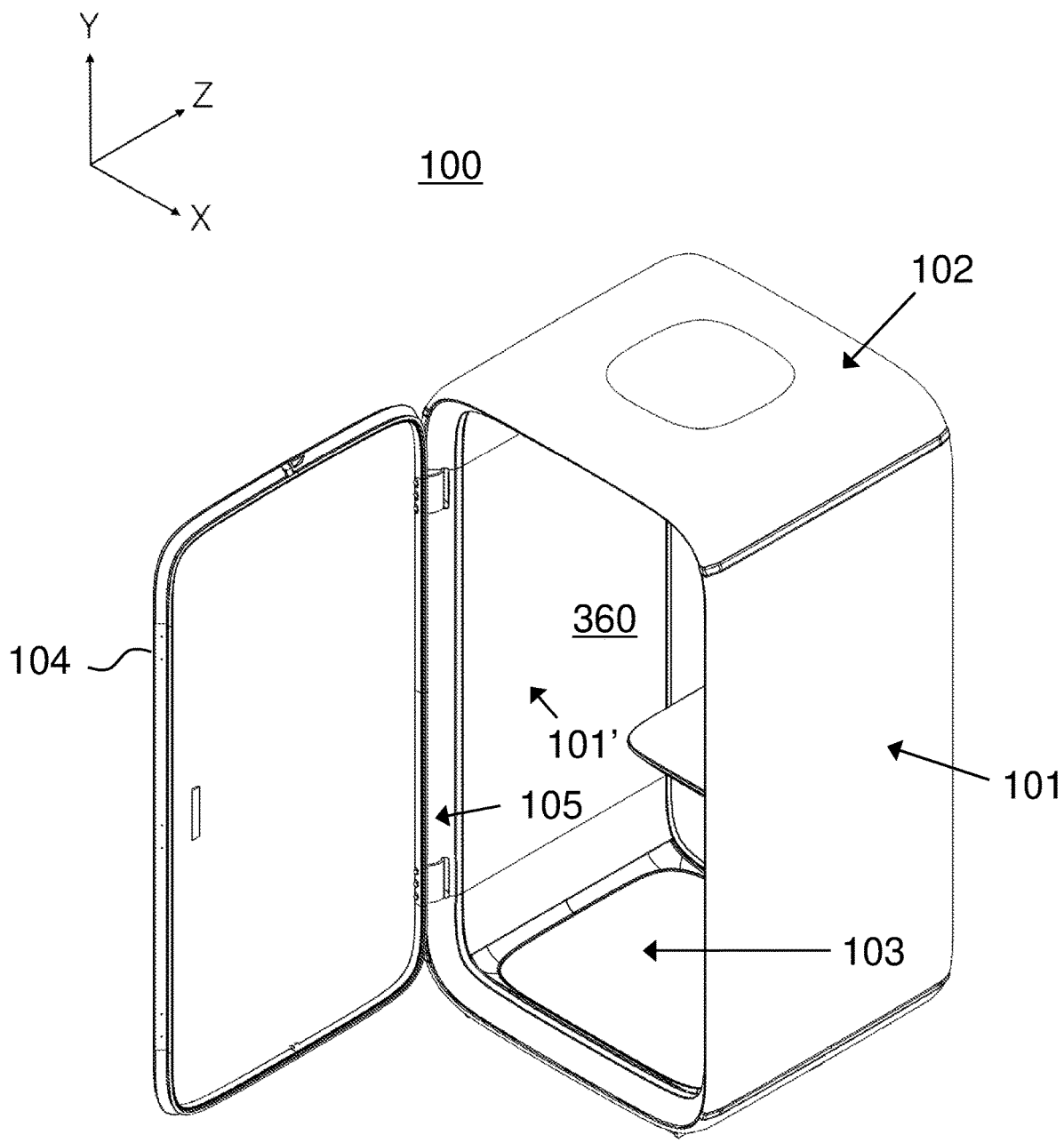
FIG. 1 shows a soundproof booth in accordance with certain embodiments.

In the following description, like reference signs denote like elements or steps. Reference is made to the figures with the following numerals and denotations:
100 Soundproof booth
101, 101' Wall module
102 Roof module
103 Floor module
104 Door
104' Window
105, 105' Door frame or window frame
311 Wall element of sound absorbing material
312 First wall
312e End portion of the first wall
313, 313a Sound absorbing material layers
314 Air layer
315 Second wall
315e End portion of the second wall
316 Cover
321 Volume for wirings and/or electrical components
322 Stiffening groove
325 Attachment region
330, 530 Marked portion
360 Soundproof space
710 Clinching joint
910, 920 Attaching element, latch
930 Mounting recess FIG. 1 shows a soundproof booth 100 that encloses a soundproof space 360 in accordance with certain embodiments. The booth 100 is formed of structural modules. Two opposite wall modules 101, 101' are connected by a roof module 102 and a floor module 103. A frame 105 attached to said modules forms a door opening of the form of a rounded rectangle, and a door 104 is hingedly attached to the frame 105. In certain embodiments, the booth 100 further comprises a window 104' (not denoted in FIG. 1) at the back side of the booth 100.

Figure 2:
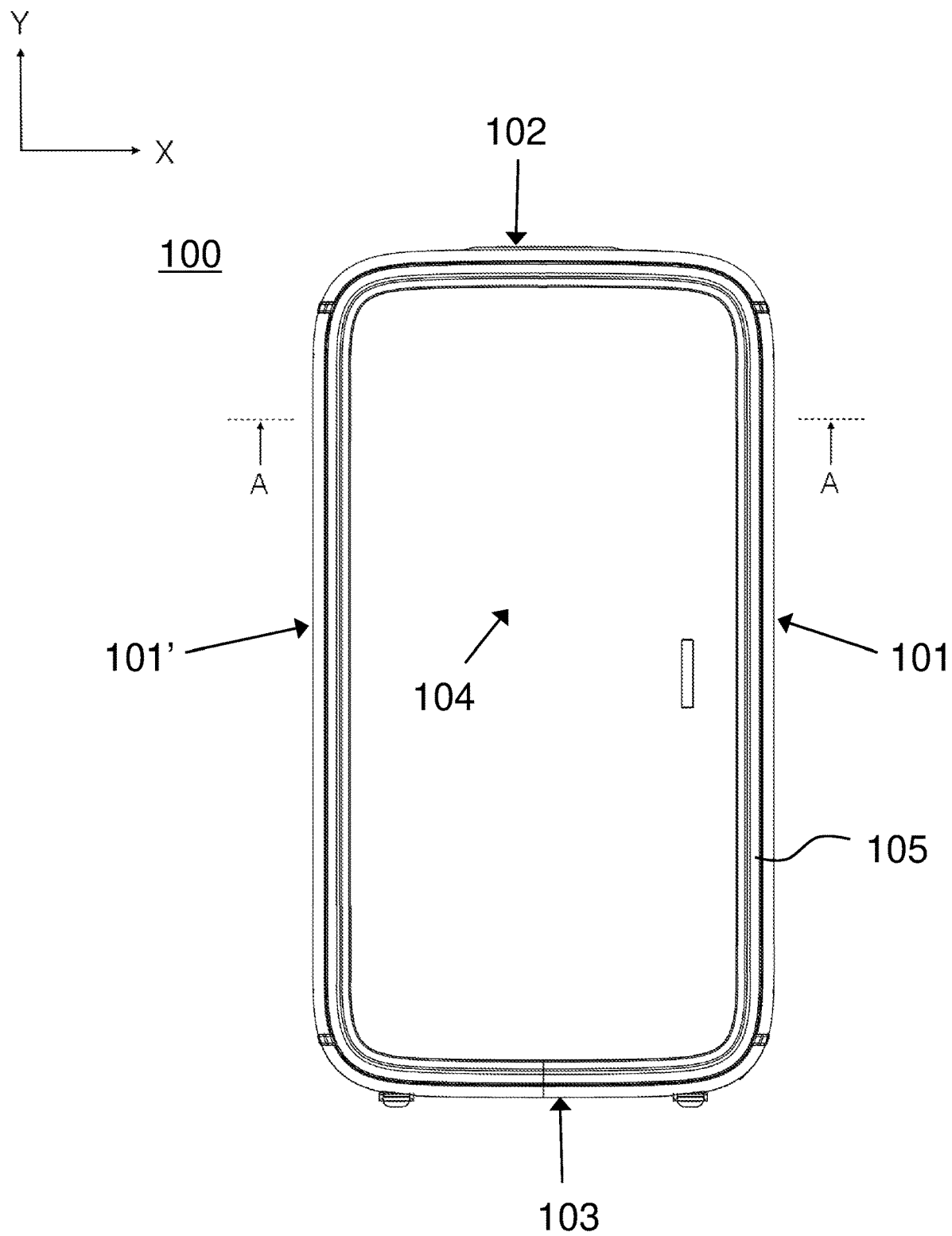
FIG. 2 shows a front view of the soundproof booth of FIG. 1.
Figure 3:
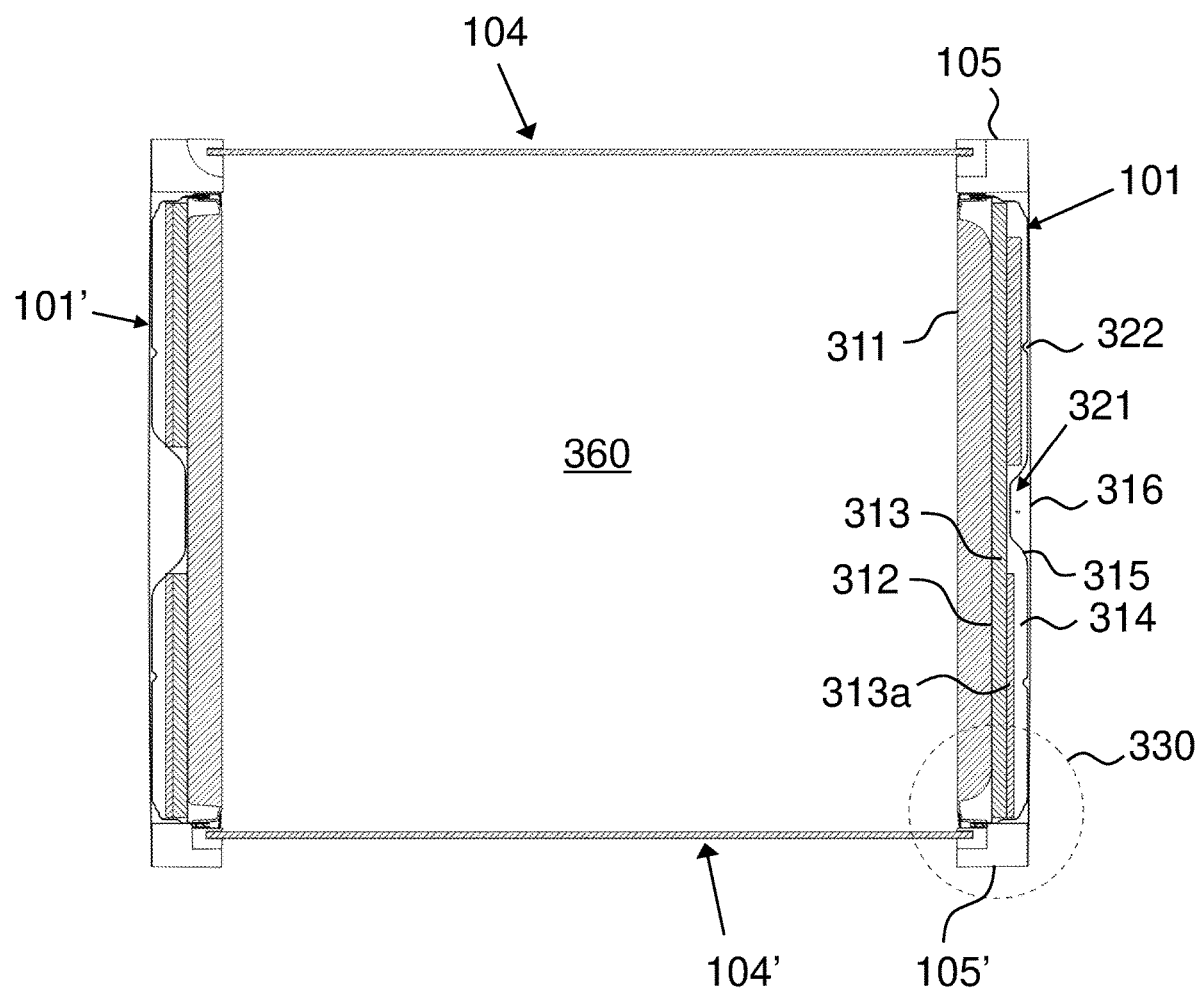
FIG. 3 shows a cross-sectional view of the soundproof booth taken at section A-A in accordance with certain embodiments.

FIG. 2 shows a front view of the soundproof booth of FIG. 1. Hereto it is noted that whilst each of the FIGS. 1-10 illustrate the soundproof booth 100 in accordance with its different embodiments, the booth 100 itself and its features may vary in between the Figures. Some features may not be presented in each and all of the Figures, and some of the features may be presented in a different level of abstraction between Figures, and also the level of detail within the one and the same Figure may vary. An example illustration of section A-A drawn in FIG. 2 is shown in FIG. 3 as a cross-sectional view.

The cross-section shown in FIG. 3 depicts a wall assembly for a soundproof space 360 that is provided by the soundproof booth 100. The wall assembly comprises the wall module 101 having a first wall 312 and a second wall 315 joined together at end portions of the wall module 101. The first and second walls 312, 315 form an enclosure therebetween. In certain embodiments, the first wall 312 is formed of a first wall element of sheet material, such as sheet metal. In certain embodiments both the first wall 312 and the second wall 315 are formed of wall elements of sheet material, such as sheet metal.

The wall assembly comprises sound absorbing material within the enclosure. In certain embodiments, the sound absorbing material within the enclosure is provided in one or more layers, for example, in at least two layers as shown in FIG. 3. A first layer 313 of sound absorbing material is positioned against the first wall 312, and a second layer 313a of sound absorbing material is positioned adjacent to the first layer 313. An optional air layer 314 is arranged in between the sound absorbing material and the second wall 315, for example in between the second layer 313a and the second wall 315. Alternatively, the air layer 314 may be arranged in between the sound absorbing material and the first wall 312.

The air layer 314 enhances sound attenuation in certain embodiments, especially with higher sound frequencies, by materially decoupling the walls 312, 315. This is advantageous in the case of attenuating human speech in which high sound frequencies are most consequential with respect to intelligibility and bystander disturbance. For this purpose, geared towards attenuating human speech in particular, the width (in the direction from the first wall 312 to the second wall 315) of the air layer 314 is preferably in the range of 30-50 mm for human speech-optimal sound attenuation.

The wall assembly further comprises a wall element 311 of sound absorbing, optionally porous, material in between the first wall 312 of the wall module 101 and the soundproof space 360. In certain embodiments, the wall element 311 is in contact with the first wall 312. In certain embodiments, the wall element 311 forms an outer(most) surface of the wall assembly on the side of the soundproof space 360 and faces the inside of the soundproof space 360. Accordingly, in certain embodiments, the wall element 311 is the innermost element of the assembly i.e. the element closest to the inside of the soundproof space 360. In certain embodiments, this wall element 311 is an upholstery panel.

On the other side of the wall module 101, the wall assembly comprises a cover 316 as the outermost (optional) layer. In certain embodiments, the cover 316 covers the second wall 315. In certain embodiments, the cover 316 is of metal. In certain embodiments, the cover 316 is of sheet material, such as sheet metal.

In certain embodiments, the wall assembly comprises a volume 321 for wirings in between the second wall 315 and the cover 316. The volume 321 may be in the form of a vertically extending groove. In certain embodiments, the volume 321 is in the form of a recess in the second wall 315.

Providing a volume 321 for wirings between the second wall 315 and the cover 316 is advantageous in that thereby wirings and/or any other electrical components can be housed within an enclosed space without providing a separate enclosure for them. Furthermore, in embodiments in which the second wall 315 and the cover 316 are incombustible, the wirings and/or any other electrical components can be housed even more advantageously within an incombustible enclosed space without providing a separate incombustible enclosure for them.

In certain embodiments, the second wall 315 further comprises a stiffening groove 322 extending, for example, vertically along the second wall 315. In an alternative embodiment, an X-shaped stiffening groove is implemented in the plane of the second wall 315.

In certain embodiments, the wall element 311 and the cover 316 do not form part of the wall module 101.

In certain embodiments, the wall module 101 is configured to extend in between two frames, such as from a first frame 105 to a second frame 105'. In certain embodiments, the first frame 105 is a door frame at a front side corner region of the booth 100 and the second frame 105' is a window frame at a rear side corner region of the booth 100.

Figure 4:
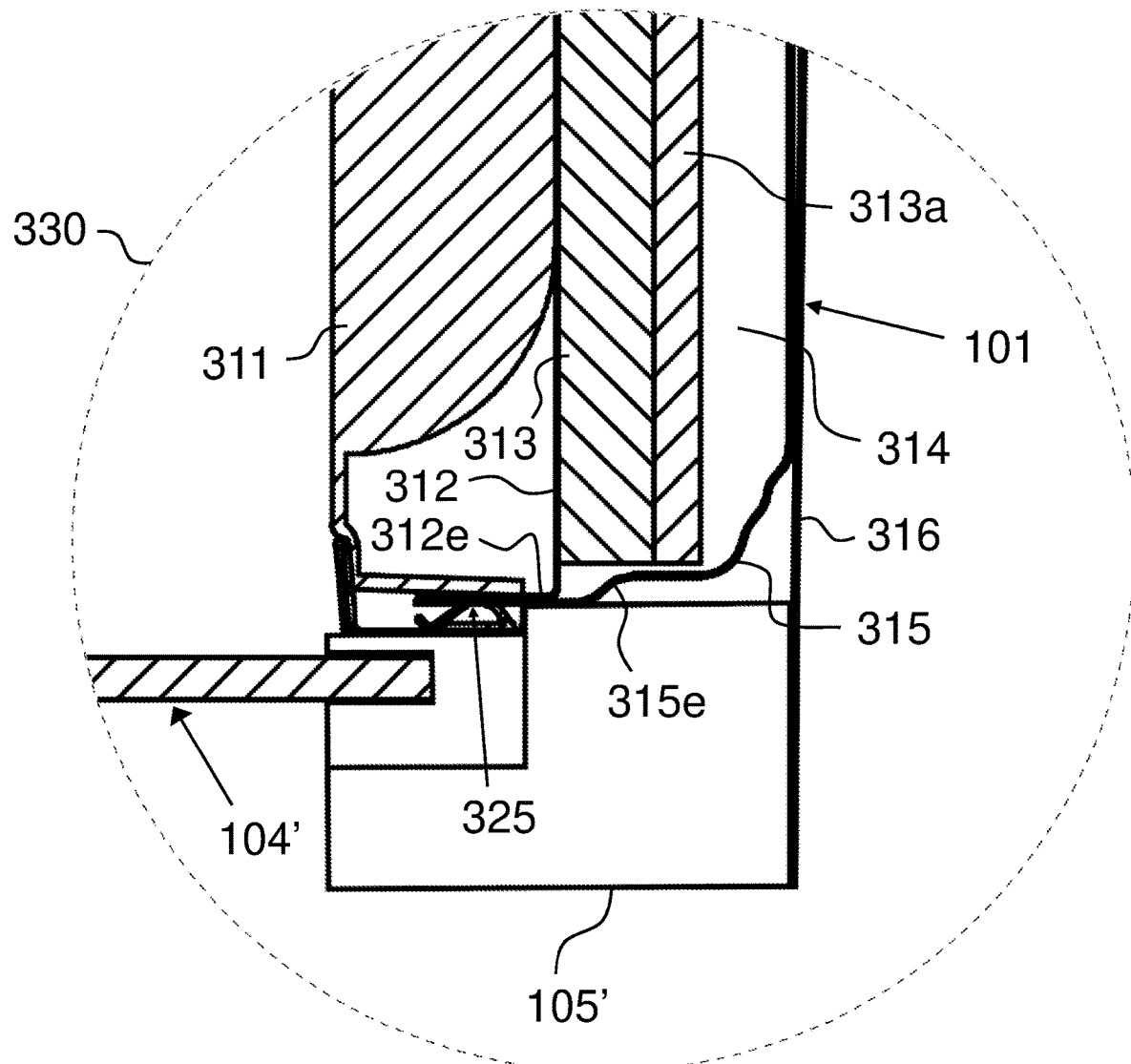
FIG. 4 shows a magnified view of a portion marked in FIG. 3.

FIG. 4 shows a magnified view of a portion 330 marked in FIG. 3. The end portions of the wall module 101 comprise attachment regions 325 at which the first wall 312 and the second wall 315 are joined together. End portions 312e, 315e of the first and second walls 312, 315 are superimposed on each other at the attachment region 325 for attachment. In certain embodiments, the second wall 315 comprises a curved or bent portion directing that wall 315 towards the other wall 312 for attachment. In certain embodiments, the first wall 312 also comprises a curved or bent portion causing the end portions of the first and second walls 312, 315 to lie one on top of the other for attachment.

Figure 5:
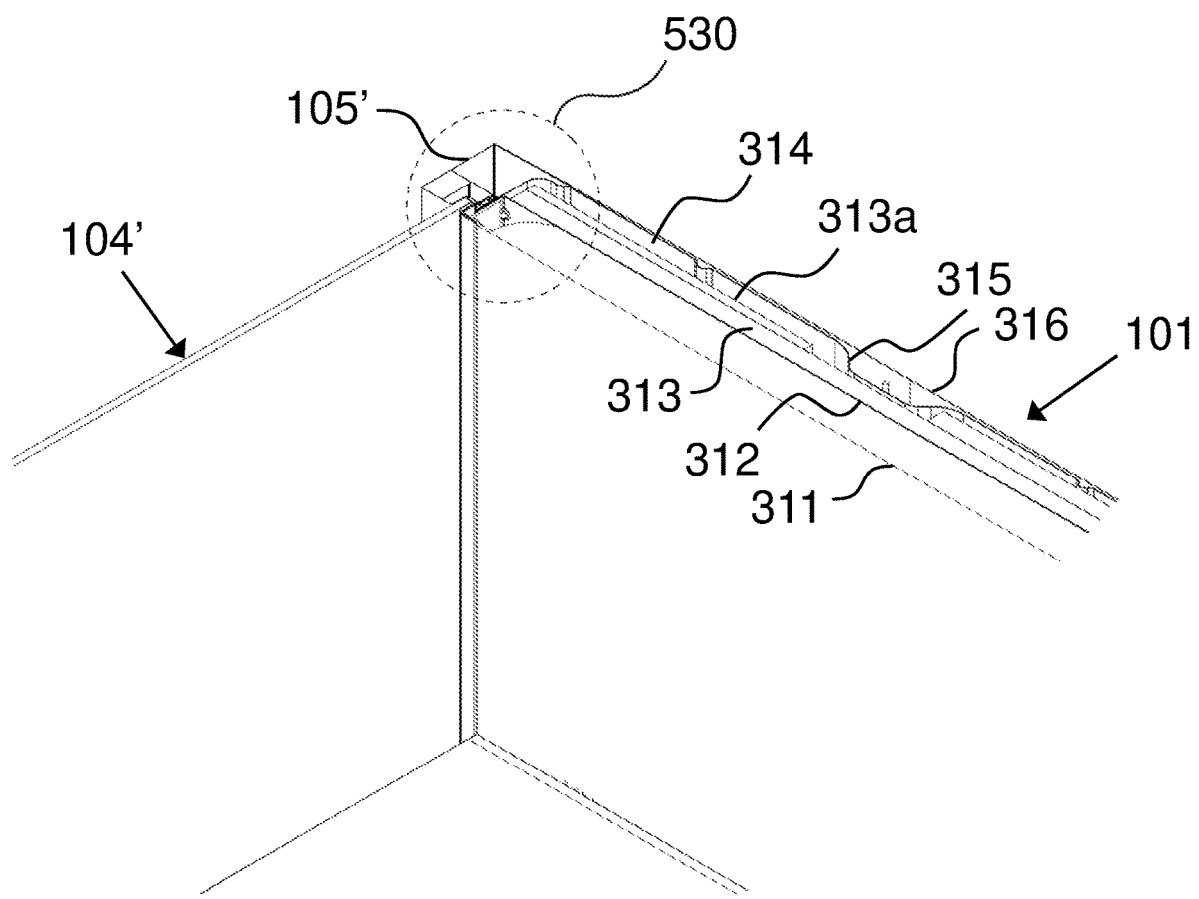
FIG. 5 shows a perspective cross-sectional view of the soundproof booth in accordance with certain embodiments.
Figure 6:
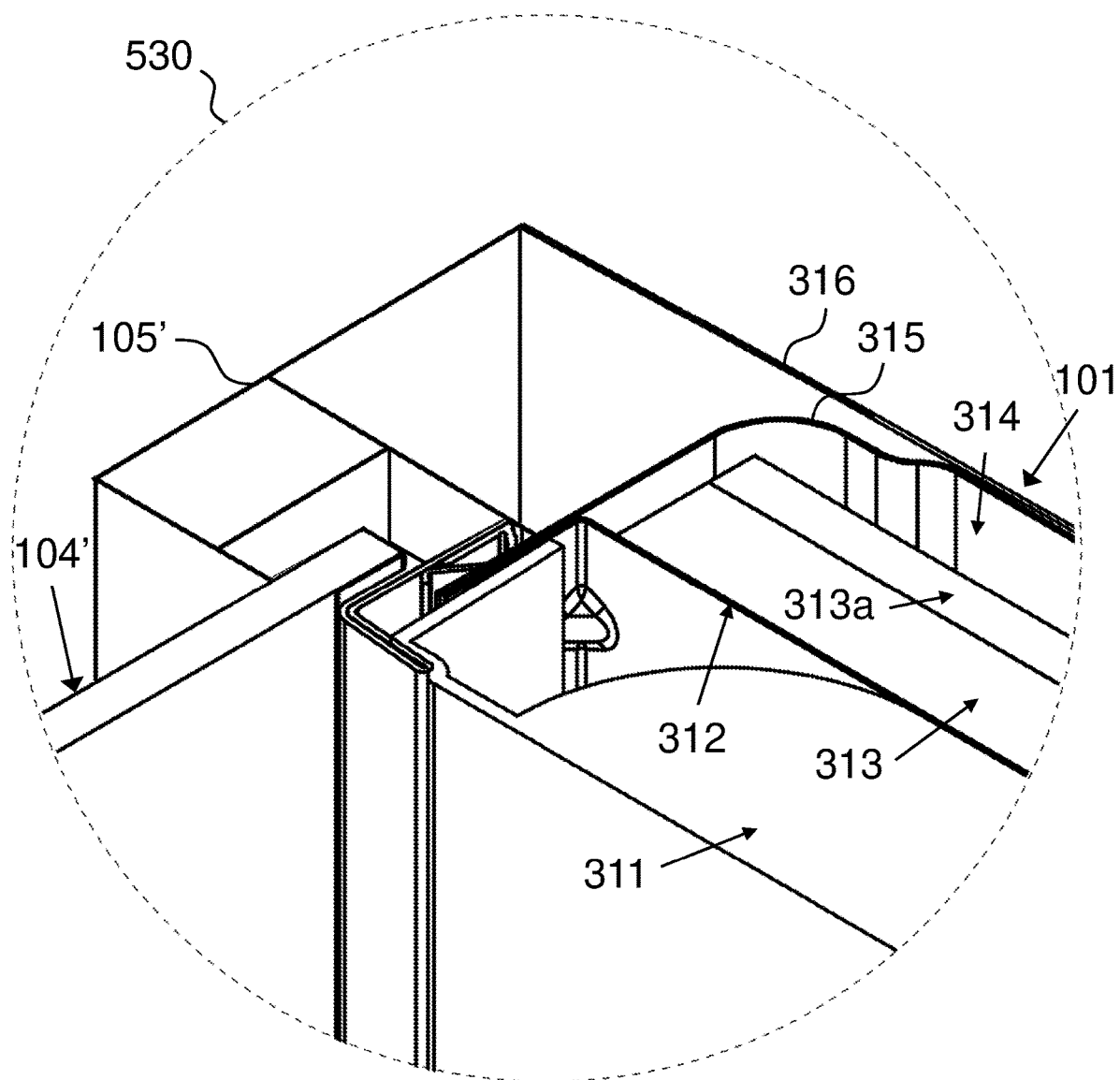
FIG. 6 shows a magnified view of a portion marked in FIG. 5.

FIG. 5 shows a perspective cross-sectional view of the soundproof booth 100 in accordance with certain embodiments, and FIG. 6 shows a magnified view of a portion 530 marked in FIG. 5 (basically corresponding to portion 330 shown in FIGS. 3 and 4 but as viewed from a different perspective). As to the structure shown in FIGS. 5 and 6 a reference is made to the preceding explanation regarding the two-dimensional representation of similar elements in FIGS. 3 and 4.

In certain embodiments, the first and second wall 312, 315 are joined together at their end portions 312e, 315e with at least one clinching joint. FIG. 7 shows a cross section of a clinching joint 710. To form such a clinching joint 710, a punch is positioned on a first side of the walls 312, 315 (or on the surface of either wall 312 or 315) and a die on the other side. The punch locally pushes the walls 312, 315 into the die and forms a kind of button that provides a mechanical interlock holding the walls 312, 315 together. The result is shown in FIG. 7. Such joining by a clinching joint 710 or several clinching joints 710 is advantageous in that it does not require any additional attachment parts, thereby simplifying the structure, does not require any potentially combustible chemicals such as adhesives, and does not introduce thermal deformations to the structure as would be the case with e.g. welding.

FIG. 8 depicts the wall module 101 with end portions 312e, 315e of the first and second walls 312, 315 joined together with clinching joints 710. The wall module 101 provides a module-wide recess and raised edges thereto formed by the first wall 312. In certain embodiments the raised edges lie in a right angle with respect to a (preferably planar) bottom of the said recess. In certain embodiments, the disclosed structure has room for the wall element 311 to be placed at least partly inside of the recess. The said enclosure behind the first wall 312 (not shown in FIG. 8) is closed sideways by the joining together of the walls 312, 315. Similarly, in the vertical direction the walls 312 and 315 are joined together at vertical end portions thereof.

In certain embodiments, the first wall 312 provides an incombustible surface. By joining the first wall 312 and the second wall 315 together at the end portions of the wall module 101 the sound absorbing material within the enclosure can be left out from a calculated fire load of the structure, thereby improving fireproofing of the booth 100 while simultaneously providing the wall module 101 with soundproofing. In addition, or alternatively, by arranging the first wall 312 to provide an incombustible surface, the fire load of the wall module 101 can be decreased and/or the fire performance of the wall module 101 increased, as the first wall 312 is not combustible and protects the subsequent layers against combustion, while simultaneously providing the wall module 101 with soundproofing. The same applies, mutatis mutandis, if the second wall 315 provides an incombustible surface.

In certain embodiments, the wall module 101 comprises an attaching element 910, a quick coupling element, such as a latch, for attaching another structural element, such as a roof module 102 or a floor module 103, to the wall module 101. FIG. 9 shows such an attaching element 910 attaching the wall module 101 to a roof module 102. In certain embodiments, the attaching element 910 resides at a region of the wall module 101 in which the first wall 312 and the second wall 315 are joined together with the benefit of providing a structurally more rigid attachment surface for the attaching element 910.

FIG. 10 shows the soundproof booth 100 with a door (or window) frame 105 attached to the wall module 101 at an end portion of the wall module 101 in accordance with certain embodiments. The wall module 101 comprises an attaching element 920, a quick coupling element, such as a latch, for attaching the frame 105 to the wall module 101. In certain embodiments, the attaching element 920 is positioned in a mounting recess 930 arranged in the wall module 101. In certain embodiments, the mounting recess 930 is arranged in the second wall 315. Such a mounting recess 930 is advantageous in that by housing the attaching element 920 in a mounting recess 930, a possible cover 316 may be attached on the outer surface of the wall module 101 with the attaching element 930 not protruding outwards from the outer surface plane of the wall module 101.

The above-described embodiments and examples are intended to explain the general idea of the disclosed solution. Therefore, such examples are not to be taken as exhausting the ways in which the general idea of the disclosed solution may be implemented.

Without limiting the scope and interpretation of the patent claims, certain technical effects of one or more of the example embodiments disclosed herein are listed in the following. A technical effect is improved fireproofing. A further technical effect is enabling efficient soundproofing by a reasonably thin wall structure. A further technical effect is improved fireproofing simultaneously with enabling efficient soundproofing by a reasonably thin wall structure. A further technical effect is providing an easy and quick assembly of a soundproof booth. An additional technical effect is providing an assembly of a soundproof booth without tools such as spanners and screwdrivers.

Various embodiments have been presented. It should be appreciated that in this document, words "comprise", "include", and "contain" are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the disclosed embodiments is only restricted by the appended patent claims.

The invention claimed is:

1. A wall assembly for a soundproof space, comprising:
a wall module having a first wall and a second wall joined together at end portions of the module to form an enclosure therebetween; and
sound absorbing material within the enclosure, wherein the enclosure is formed of said first wall and said second wall, and wherein the first wall or the second wall provides an incombustible surface, wherein the wall assembly comprises:
a cover covering the second wall, and wherein the wall assembly comprises a volume for wirings in between the second wall and the cover.

2. The wall assembly of claim 1, comprising:
a first wall element of sheet material forming the first wall and a second wall element of sheet material forming the second wall, and the enclosure is formed of said sheet material or materials.

3. The wall assembly of claim 1, wherein the end portions of the wall module comprise attachment regions at which the first wall and the second wall are joined together.

4. The wall assembly of claim 1, comprising end portions of the first and second wall superimposed on each other for attachment.

5. The wall assembly of claim 1, wherein one of the first and second walls comprises a curved or bent portion directing that wall towards the other for attachment.

6. The wall assembly of claim 5, wherein the said other wall also comprises a curved or bent portion to cause the end portions of the first and second walls to lie one on top of the other for attachment.

7. The wall assembly of claim 1, comprising the first and second wall joined together at their end portions with at least one clinching joint.

8. The wall assembly of claim 1, comprising:
a wall element of sound absorbing material on the side of the first wall facing away from the enclosure.

9. The wall assembly of claim 8, wherein the wall module provides a module-wide recess and raised edges thereto formed by the first wall to place the wall element of sound absorbing material at least partly inside of the recess.

10. The wall assembly of claim 1, comprising the wall module configured for attaching a door frame or window frame to the wall module at an end portion of the module.

11. The wall assembly of claim 1, comprising:
an air layer within the enclosure in between the sound absorbing material and either of the first and the second walls.

12. The wall assembly of claim 1, wherein the cover covering the second wall is of sheet material.

13. The wall assembly of claim 1, wherein the first wall and the second wall are sheet metal elements.

14. The wall assembly of claim 1, wherein the wall module comprises an attaching element, such as a latch, for attaching another structural element, such as a roof module or a floor module, to the wall module.

15. The wall assembly of claim 14, comprising the attaching element at a region of the wall module in which the first wall and the second wall have been joined together.

16. A soundproof booth, comprising the wall assembly of claim 1.

17. The soundproof booth of claim 16, comprising structural modules, including the said wall module, attached to each other to form a structure encircling the soundproof space.

18. The soundproof booth of claim 17, comprising a door frame attached to said encircling structure for attaching a door.

\* \* \* \* \*